(12) United States Patent
Carli (10) Patent No.: US 7,350,307 B2
(45) Date of Patent: Apr. 1, 2008

(54) SYSTEM AND METHOD FOR CHECKING MECHANICAL PIECES, WITH WIRELESS SIGNAL TRANSMISSION

(75) Inventor: Carlo Carli, Ferrara (IT)

(73) Assignee: Marposs Societa' per Azioni, Bentivoglio (BO) (IT)

( * ) Notice: Subject to any disclaimer, the term of this patent is extended or adjusted under 35 U.S.C. 154(b) by 0 days.

(21) Appl. No.: 10/594,511

(22) PCT Filed: Mar. 31, 2005

(86) PCT No.: PCT/EP2005/051457

§ 371 (c)(1),
(2), (4) Date: Sep. 28, 2006

(87) PCT Pub. No.: WO2005/098350

PCT Pub. Date: Oct. 20, 2005

(65) Prior Publication Data

US 2007/0205779 A1 Sep. 6, 2007

(30) Foreign Application Priority Data

Apr. 1, 2004 (IT) ............................ BO2004A0182

(51) Int. Cl.
*G01B 21/04* (2006.01)
*G01B 7/004* (2006.01)
(52) U.S. Cl. .......................................... 33/503; 33/558
(58) Field of Classification Search .................. 33/503, 33/504, 505, 556, 557, 558, 559, 560, 561
See application file for complete search history.

(56) References Cited

U.S. PATENT DOCUMENTS

| 4,578,874 | A | | 4/1986 | Juengel |
| 5,778,550 | A | | 7/1998 | Carli et al. |
| 6,118,567 | A | * | 9/2000 | Alameh et al. ............. 398/191 |
| 6,360,090 | B1 | * | 3/2002 | Holcombe et al. .......... 455/307 |
| 6,526,670 | B1 | | 3/2003 | Carli |

FOREIGN PATENT DOCUMENTS

| EP | 1 130 557 A2 | 9/2001 |
| WO | WO 99/41856 | 8/1999 |
| WO | WO 2006018941 A1 * | 2/2006 |

* cited by examiner

*Primary Examiner*—Alexander R. Smith
(74) *Attorney, Agent, or Firm*—Dickstein Shapiro LLP (57) ABSTRACT

A system for detecting the position and/or the dimensions of mechanical pieces (3) includes a checking probe (1) with detection devices (2) and a remote transmitter (4), a receiver (7) being remotely placed from the probe to wirelessly receive, from the remote transmitter, pulse signals (5) indicative of the state of the probe. The receiver includes automatic control circuits that detect the presence of noises (NS) on the basis of attributes, e.g. the distribution in amplitude, of the received signal and, consequently, dynamically vary the sensitivity of the receiver, e.g. by acting on the amplification of the received signal or on a threshold (VTH) with which the received signal is compared. The pulse signals can be of optical type and the automatic control of sensitivity can be active in the presence of noise signals emitted by lamps located in the environment.

16 Claims, 6 Drawing Sheets

SYSTEM AND METHOD FOR CHECKING MECHANICAL PIECES, WITH WIRELESS SIGNAL TRANSMISSION

TECHNICAL FIELD

The present invention relates to a system for detecting the position or dimensions of a piece, including at least a checking probe with detection devices, a remote transmission unit, connected to the detection devices of the probe, and adapted for wirelessly transmitting pulse signals indicative of the state of the probe, and a receiver unit, adapted for wirelessly receiving signals and including an input section, with at least one receiver device, adapted for providing input signals, a generation and control section adapted for generating and for defining reference signals, and a comparison section connected to the input section and to the generation and control section, adapted for providing output signals responsive to the results of comparisons between the input signals and the reference signals, the generation and control section including threshold generating circuits and automatic checking circuits for automatically checking the difference in amplitude between the input signals and the reference signals.

The invention also relates to a method for checking the dimensions or the position of a piece, by means of at least one checking probe including detection devices, at least one remote transmission unit connected to the checking probe and adapted for wirelessly transmitting signals in the form of pulses, and a receiver unit, adapted for receiving the signals in the form of pulses, whereby input signals in the receiver unit are compared in amplitude with reference signals for providing output signals, and the difference in amplitude between the reference signals and the input signals is varied in a dynamic way.

BACKGROUND ART

There are known measuring and control systems, e.g. in numerical control machine tools, for detecting the position and/or the dimensions of machined pieces by a contact detecting probe, mounted in the machine. In a system of this type, shown in simplified form in FIG. 1, a checking probe 1, for example a contact detecting probe, that, in the course of a checking cycle, displaces with respect to a piece 3 being machined, touches the surfaces to be checked and responds to contact, detected by suitable detecting devices identified with reference number 2, by wirelessly transmitting, by means of a transmitter 4, pulse signals 5—that identify the state of the probe 1—to a receiver 7, usually located at a certain distance from the probe 1. The receiver 7 is in turn connected, by means of an interface device 9, to the numerical control unit 11 of the machine that, by processing other signals indicative of the spatial position of probe 1, obtains information about the position of the surfaces of the piece 3. At times the interface device 9 can be integrated at the interior of the receiver 7.

The contact detecting probe can include electric batteries for the power supply of contact detecting circuits and of the transmitter 4 that can operate, for example, by emitting signals (5) of optical or radio-frequency type. U.S. Pat. No. 5,778,550 discloses a measuring system with these characteristics and describes a checking probe with circuits for sending suitably coded, optical signals in the infrared band, and a receiver unit including one or more photodiodes, amplification circuits and shaping circuits for reconstructing a sequence of pulses corresponding to the received optical signals. In the shaping circuits, the received and amplified signal is compared with a suitable threshold, whose value can be altered for varying the sensitivity of the receiver in the course of specific operation phases of the system.

Figure 2:
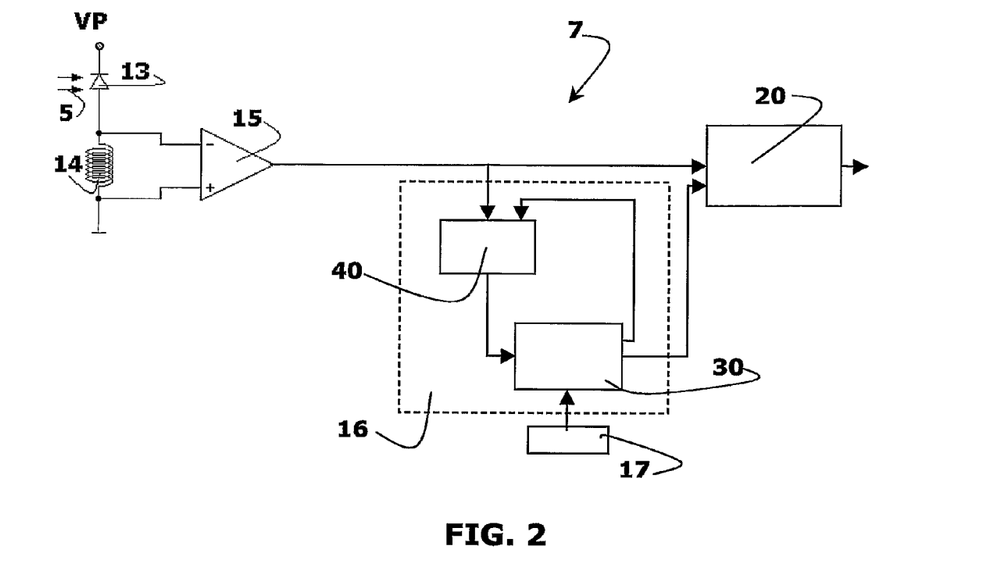
FIG. 2 is a partial functional block diagram of a unit for receiving coded radiations according to a known embodiment.

There are also known systems with receiver units 7 that include the characteristics described in the prior art portion of claim 1, as shown in simplified form in FIG. 2, where an input section includes a receiver device, for example a photodiode 13, that receives the optical signals 5 and amplification circuits with an amplifier for example of the differential type, 15, whose output, more particularly the amplitude of the amplified signal, or input signal, is compared, in the circuits of a comparison section 20, with values of a reference signal, or threshold, for generating—and sending to the interface device 9—a sequence of pulses including the information received from the remote probe 1. Typically, the optical signals 5 are transmitted by the probe 1 as groups or trains of coded pulses, for example groups of few pulses of few microseconds. The groups occur at approximately 15-20 millisecond intervals.

The threshold is generated and dynamically varied by the circuits of a generation and control section 16, on the basis of both indications arriving from a logic 17 and attributes of the received optical signal 5.

More specifically, the logic 17 communicates to generating circuits 30 of the section 16 information relating to the specific application, for example on the basis of data that the operator has set in hardware (dip-switch) memories, and/or to particular operation phases, as briefly cited above with reference to U.S. Pat. No. 5,778,550. Dynamic variations of the threshold are instead caused by automatic control circuits, more specifically detecting circuits 40, on the basis of amplitude peaks of the input signals. In practice, the threshold is quickly varied, with respect to a maximum sensitivity value defined on the basis of the signals of the logic 17, so as to reduce its distance from the peak amplitude of the input signal, and to maintain a reduced sensitivity for a short period of time, sufficient for preventing the generation of false output pulses owing to possible signal distortions in the receiver circuits when the signal is strong.

A typical case foresees, for example, quick threshold increments (or decrements, if the threshold has negative value) until reaching values close to the peak amplitude of the input signal, with time constant in the order of the microsecond, and a return to the maximum sensitivity value within a period of time in the order of the millisecond. The time interval in the course of which the sensitivity of the receiver is diminished is sufficiently long for overcoming noises that could occur caused by the distortion of a group of pulses.

Probe receivers with these characteristics are manufactured and marketed with good results by the same applicant of the present patent application since the 90's. These receivers include, among other things, circuital components acting as high-pass filter for reducing the negative effects due to the continuous and low-frequency components of the surrounding environmental illumination and for inhibiting from subsequent processings low-frequency noise components emitted, for example, by fluorescent and incandescent lamps located in the surrounding environment where the receiver operates. The winding or inductor 14 of FIG. 2 shows, in simplified form, the previous high-pass filter. Furthermore, there can be foreseen cells for the high-pass filtering at the interior of the amplifier 15.

However, there is the possibility that radiations emitted in an unforeseeable way by fluorescent lamps or by other sources of light in the environment be processed by the receiver together with the signals transmitted by the probe thereby causing malfunctions.

It has been experienced that fluorescent lamps emit improper and unforeseeable radiations, even in the infrared radiation band, and that these radiations have considerable high-frequency amplitude modulation components, i.e. in the frequency band of the useful signals, in other terms of the pulse signals 5. These radiations vary depending on the type of lamp, on the environment temperature, on the power supply voltage, on the age and the efficiency conditions of the lamp itself.

In the known embodiment shown in FIG. 2 the maximum sensitivity is reset after the elapse of a time that is relatively short with respect, for example, to the typical time interval between groups of pulses transmitted by the transmitter 4 of the probe 1. It is possible to envisage to lengthen this time for improving immunity to noise, but this could involve the risk of loosing "good" signals, if the amplitude of these signals rapidly decreases in consequence, for example, of the probe 1 rapidly displacing away from the receiver 7.

DISCLOSURE OF THE INVENTION

Object of the present invention is to provide a system and a method for checking the position and/or the dimensions of mechanical pieces that, by preserving the positive accuracy and the intrinsic reliability characteristics of the known systems and of their associated methods that utilize a probe with wirelessly detecting and transmitting devices, are extremely reliable even when there are electromagnetic noises in the surrounding environment.

This and other objects are achieved by a system in which the automatic checking circuits include discriminating circuits adapted for detecting at least one attribute of the input signals and for varying the difference in amplitude if the detected attribute corresponds to wirelessly received signals that differ from the pulse signals transmitted by the remote unit.

This object is achieved also by a method including the steps of identifying the noise signals on the basis of attributes differing from those of the signals transmitted by the remote transmission unit, and consequently varying in a dynamic way the difference in amplitude.

According to a specific embodiment, the attribute of the received signals that is checked and identified is the distribution, as a function of time, of the amplitude of the signal.

Systems and methods according to the present invention, by relying the sensitivity variations of the receiver on the identification and on the discrimination of the unwanted signals as compared to the useful signals, concurrently guarantee immunity to environment noises and reliability insofar as the proper reception of the useful signals arriving from the probe transmitter are concerned.

BRIEF DESCRIPTION OF THE DRAWINGS

A preferred embodiment of the invention is hereinafter described with reference to the enclosed sheets of drawings, given by way of non-limiting example, wherein.

BEST MODE FOR CARRYING OUT THE INVENTION

Figure 1:
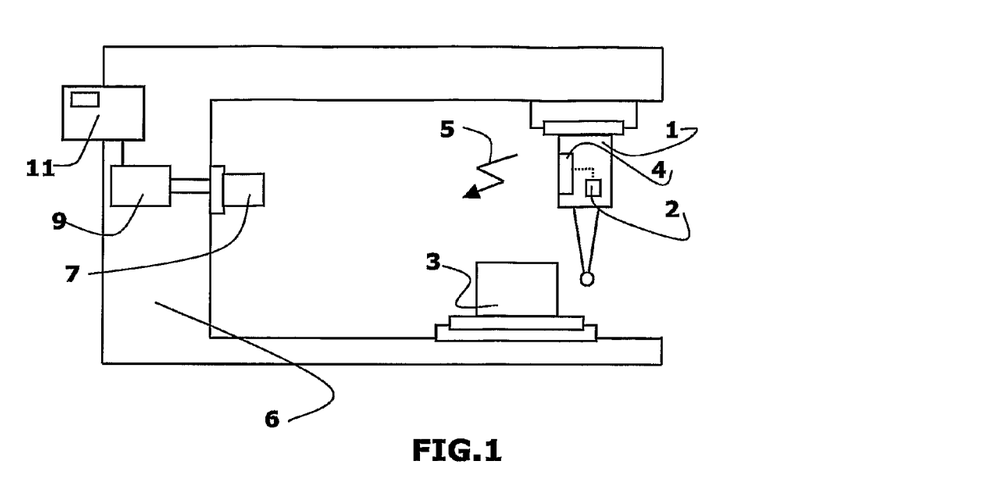
FIG. 1 shows, in simplified form, a machine tool carrying a checking probe for detecting the position or linear dimensions of mechanical pieces.

The previously partially described FIG. 1 illustrates, in simplified form, a system for checking the position and/or the dimensions of the piece 3 on the machine tool (for example a machining center identified in the figure by reference number 6), where the piece 3 is machined. The computer numerical control 11 supervises the operation of machine tool 6. The checking probe 1 is coupled to slides and carries a remote transmission unit (the previously mentioned transmitter 4) for transmitting infrared optical signals to the receiver, or receiver unit 7, that, for example, is coupled with the bed of the machine tool 6.

Figure 3:
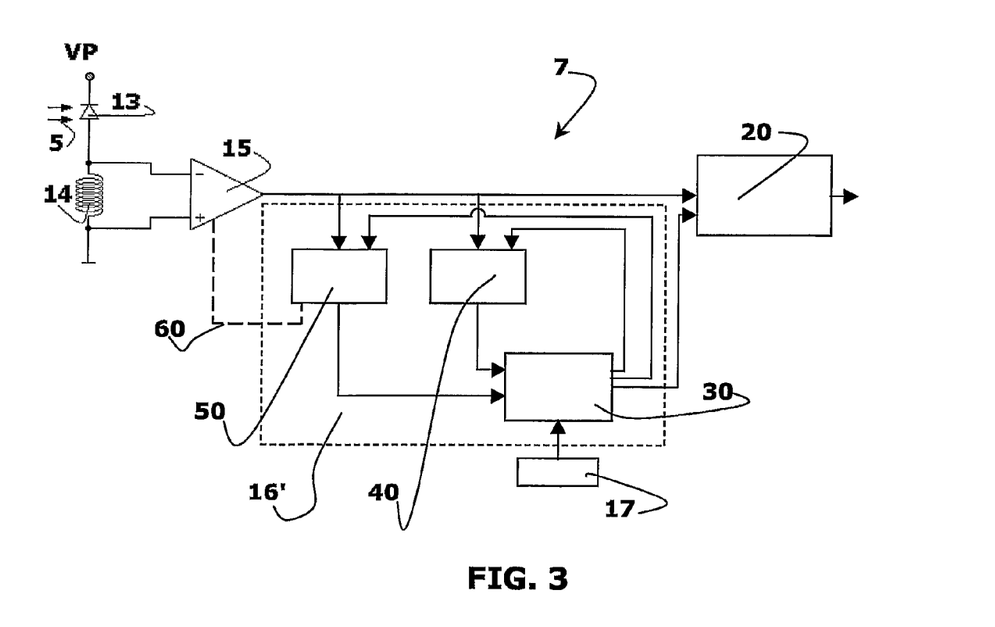
FIG. 3 is a partial functional block diagram of a unit for receiving coded radiations according to an embodiment of the invention.

Some components of the receiver unit 7 are shown in simplified form in FIG. 3 in which like reference numbers as those of FIG. 2 are used to denote like parts. In substance, the receiver unit 7 shown in FIG. 3 differs from the receiver shown in FIG. 2 insofar as section 16' is concerned, where, with respect to section 16, the automatic checking circuits also include discriminating circuits 50 that, like the detecting circuits 40, receive the input signals and an output of the threshold generating circuits 30, and have the output connected to the latters.

As hereinafter described in more detail, in the receiver unit 7 the circuits of the generation and control section 16' enable to dynamically generate and define the threshold not just based on the amplitude peak of the received and processed signal (per se known detecting circuits 40), but also by singling out (discriminating circuits 50) an attribute of the input signals that identifies it as a noise signal emitted, for example, by a fluorescent lamp located in the surrounding workshop environment. This attribute can be, according to a preferred embodiment of the present invention, the distribution of the amplitude as a function of time or, according to one of the possible alternatives hereinafter not described in detail, the distribution as a function of frequency (spectral characteristics of the signal).

While the transmitter signals consist, as previously described, in trains of few pulses (typically 3 or 4), each of few microseconds (for example 4 μs), and these trains occur every 15-20 milliseconds, it has been realized that the noises emitted by fluorescent lamps are distributed in an unforeseeable way but always have greater "density" with respect to the useful/useable signals. In other terms, the duty-cycle of the noises, i.e. the ratio between the time in the course of which—at a specific interval—the amplitude of the noise takes non-negligible values and the duration of said interval, is definitely longer than that of the useful signal.

Figure 4:
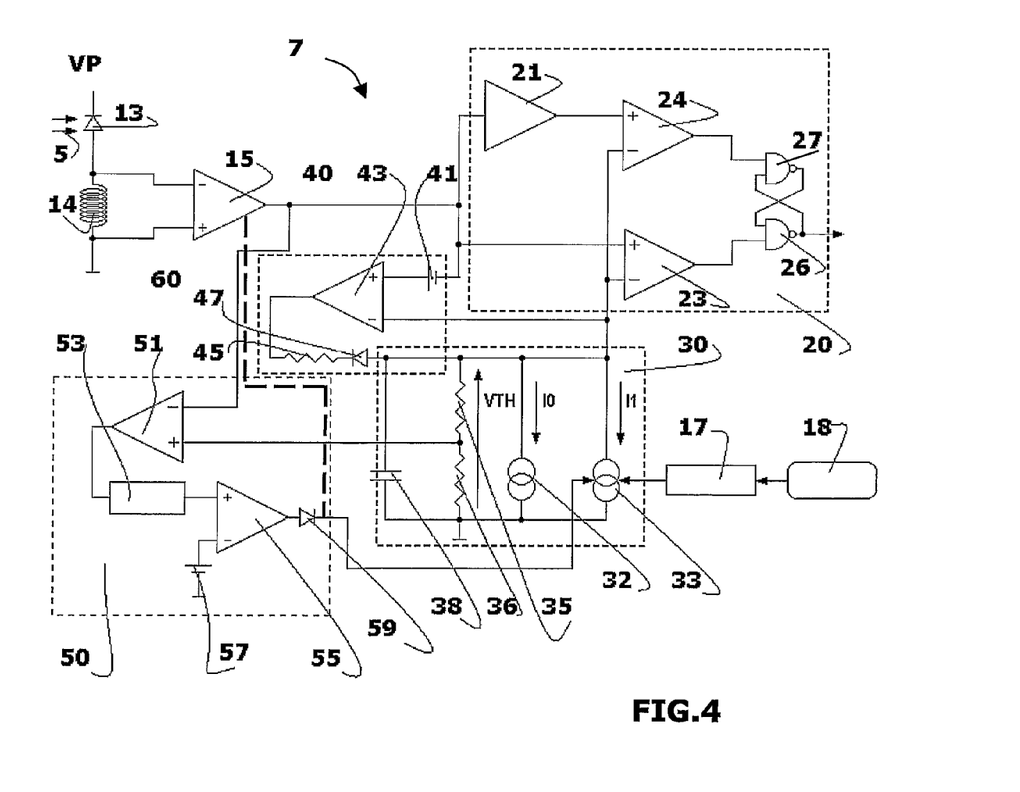
FIG. 4 is a partial functional block diagram of the receiver unit of FIG. 3, with greater functional details.

FIG. 4 shows in more detail with respect to FIG. 3 a partial functional diagram of the receiver unit 7 according to the invention.

More particularly, in the comparison section 20 there is an analog inverter 21, connected to the output of the amplifier 15, and two comparators 23 and 24 that compare, respectively, the output of the amplifier 15 and of the inverter 21, with the threshold generated by circuits 30.

The outputs of the comparators 23 and 24 are utilized for setting and for resetting a bistable multivibrator or flip-flop, represented by the "NAND" logic gates 26 and 27 suitably interconnected, the output of which is sent to the interface device 9.

In the threshold generator circuits 30, a fixed current generator 32 and a variable current generator 33 are represented, the latter being connected to the logic 17 and to the output of the discriminating circuits 50. Other component parts of the generating circuits 30 are two resistors 35 and 36 and a capacitor 38.

In the detecting circuits 40 there is a voltage generator 41, connected to the output of the amplifier 15, and a differential amplifier 43 that receives at the input both the signal arriving from the amplifier 15 increased (in algebraic terms) by the signal of the generator 41, and an output of the generating circuits 30. The output of the differential amplifier 43 is also connected to the generating circuits 30 through circuital components represented by a resistor 45 and a diode 47.

Lastly, the discriminating circuits 50 include an additional comparator 51, a low-pass filter 53 of the first order with relatively high time constant (in the order of a tenth of a second), an additional differential amplifier 55, a voltage generator 57 and a diode 59. More specifically, the additional comparator 51 receives, from the amplifier 15, the input signals and also a dedicated output of the generating circuits 30, and provides the low-pass filter 53 with a signal that reaches the additional differential amplifier 55. The latter, that also receives the voltage supplied by generator 57, has the output connected, through the diode 59 (that normally does not conduct), to a dedicated input of the generating circuits 30, in particular to the variable current generator 33.

The operation of the receiver unit 7 shown in FIG. 4 will now be described with the aid of the graphs of FIGS. 5, 6 and 7.

Figure 5:
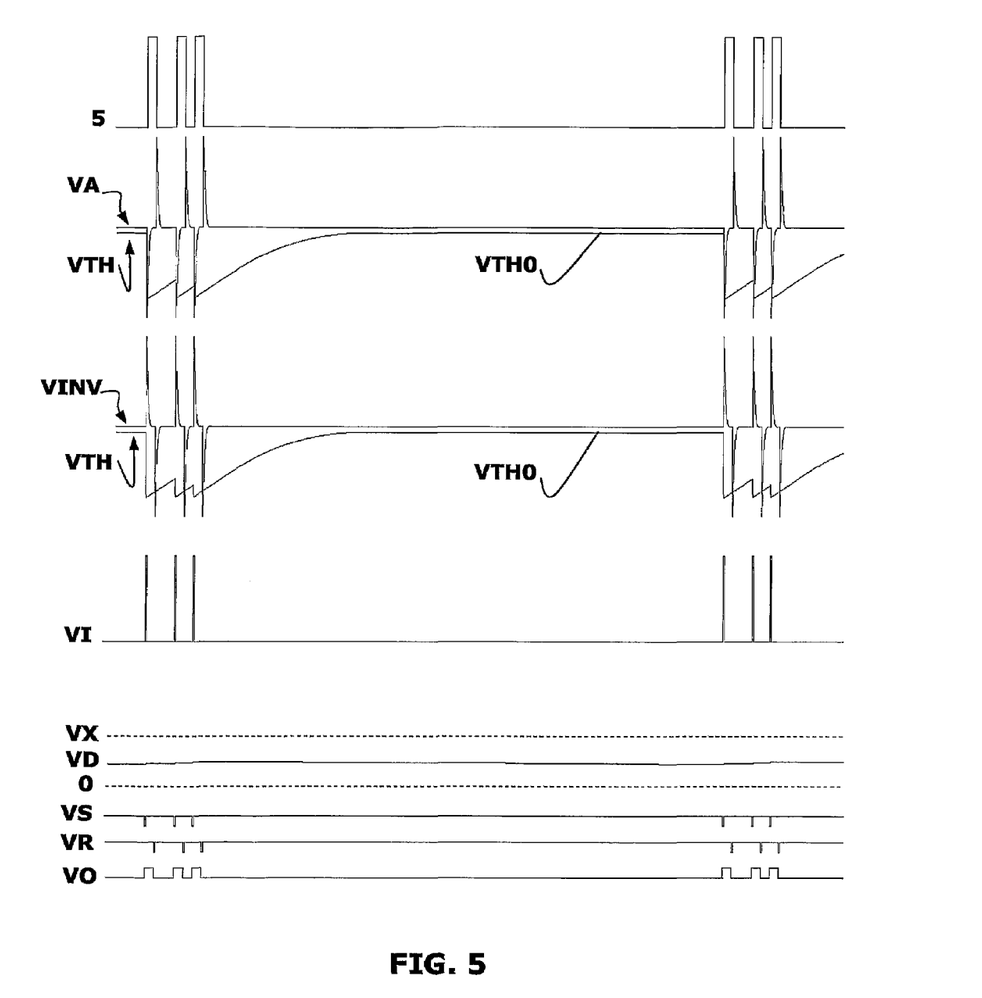
FIGS. 5, 6 and 7 are graphs showing the trends of some of the signals in the receiver unit of FIG. 4.

The first graph line of FIG. 5 represents the signal 5, in form of optical pulses, transmitted by the transmitter 4 and received by photodiode 13. As previously described, the signal 5 typically includes trains of few microsecond pulses at several millisecond time intervals. For the purpose of providing simplicity to the description, the signal 5 represented in FIG. 5 does not comply with the proportion between the duration of the trains of pulses (microseconds) and the time interval between two subsequent trains (milliseconds). In consequence, the above applies analogously to the other graphs of FIG. 5 and FIGS. 6 and 7.

The photodiode 13 is inversely polarized by a suitable polarization voltage VP and the current flowing in it, that is proportional to the incident optical power, flows across the inductor 14, at the terminals of which there is therefore available a voltage that approximate the derivative of the incident optical signal 5. The derivation made by the inductor 14 strongly attenuates the continuous and low-frequency components due to environment light.

Another advantage provided by the use of the inductor 14 as load of the photodiode 13 is that the inverse polarization of the photodiode 13, necessary for its correct operation, is maintained even if the latter allows a relatively strong direct current to flow owing to intense environment illumination. In practical embodiments, the inductive impedance of the inductor 14 can be synthesized, in a per se known way, by suitable circuits with active components so avoiding the use of windings that have known negative drawbacks, as layout dimensions, fragility, parasitic capacity, etc. Then the signal is amplified by the amplifier 15.

According to a preferred embodiment, the transfer characteristic of the amplifier 15 is not linear, so when strong signals are received their amplitude is compressed, by means of a per se known controlled distortion, in order to prevent the saturation of amplifier 15. Furthermore, the amplifier 15 implements, in an also known and herein not minutely described way, an additional high-pass filter against the low-frequency noises of the environment light.

The input signal VA provided by the amplifier 15 consists of short pulses with negative and positive polarity, respectively at upward and downward fronts of the received optical pulses 5. The amplifier 15 introduces, because of the poles associated with its high-pass transfer function, small transitory components ("tails") at the end of each pulse. These components become evident when the received signal is very strong, but they do not create inconveniences thanks to the operation of circuits 30 and 40, as previously mentioned, and thus, for the sake of greater clarity, have not been shown in the drawings. The signals VA and VINV, the latter obtained by polarity inverting the signal VA by means of the analog inverter 21, are provided to the comparators 23 and 24 that compare said signals with a reference signal, more specifically a threshold voltage VTH supplied by the generating circuits 30. By assuming that the diode 47 does not conduct (this occurs, for example, when it does not receive any type of signal), the threshold voltage VTH has, for example, basis value VTH0 negative and proportional to currents I0 (fixed) and I1 (variable) supplied by the generators 32 and 33, respectively. The fixed current I0 defines the maximum sensitivity threshold. In order to guarantee good performance, it is obviously desirable that the value of the maximum sensitivity threshold be, in terms of absolute value, as small as possible. However, its absolute value must also exceed, with adequate margin, the peak value of the electric noise intrinsically generated by the amplifier 15 and by the photodiode 13. The generator of the variable current I1 is controlled by the logic 17 and also by the discriminating circuits 50—as hereinafter described—and its function is to further shift the basis value VTH0 of the threshold voltage VTH in order to reduce the optical sensitivity. In the described example this shift is towards more negative values of the amplitude of VTH. The reduction can be set by the operator, by operating manually-operated programming devices or dip-switch 18 (FIG. 4), in order to attempt to solve problems of optical noise reception, or it can be carried out when specific control functions, as those described in the previously mentioned U.S. Pat. No. 5,778,550, are enabled, again upon the operator's request. In any case, in the known system of FIG. 2, the current I1 does not dynamically vary as a function of the received signals.

When the peak amplitude of the signal VA exceeds in terms of absolute value the voltage VTH by a predetermined minimum amount, defined by the voltage generator 41, the diode 47 conducts and thus a feedback loop closes, causing the threshold voltage VTH to vary towards values that are the more negative the more the received optical signal 5 is strong, hence providing a reduction in sensitivity. The values of resistances R1, R2 and R3 of resistors 35, 36 and 45 and of capacity C1 of capacitor 38 define the amounts of time required for the threshold voltage VTH to change and for the voltage to return to the basis value VTH0 previously set and defined by the currents I0 and I1 and by the resistances R1 and R2. More specifically, the resistance R3 of the resistor 45 has considerably smaller value than the resistances R1, R2 of the resistors 35, 36.

Therefore, the time constant for the actuation (decrease of the voltage VTH) defined by R3*C1 is very short (approximately 1 µs), for allowing the level of VTH to be shifted even by a single pulse of the signal VA. On the contrary, the time constant for returning to the basis value VTH0, defined by (R1+R2)*C1 is definitely longer (in the order of magnitude of 1 ms), higher than the duration in time of the train of pulses of the useful signal 5.

Hence, at the output of the comparators 23 and 24 there are short pulses, represented in FIG. 5 with the lines VS and VR, respectively, at the upward and downward fronts of the received optical pulses 5. Therefore, the flip-flop consisting of "NAND" gates 26 and 27 is alternatively set and reset so as to reconstruct a sequence of pulses (output signal VO) corresponding to the sequence of the pulse signal 5 transmitted from the transmitter 4 and received by the photodiode 13. The signal VO is sent to the interface device 9, that can be integrated in the receiver 7, where subsequent known processings enable to trace back to the information arriving from the probe 1.

In the discriminating circuits 50, the input signal VA provided by amplifier 15 is compared with a fraction of the threshold voltage VTH defined by the ratio of the values of the resistances R1 and R2 of resistors 35 and 36 (if R1=R2 the threshold at the input of comparator 51 has halved value with respect to the threshold VTH). When the receiver unit 7 receives the signal 5 with no substantial noises, according to the arrangement herein so far described with reference to FIG. 5, the outcome of the verification carried out in the discriminating circuits 50 is negative and no control signal is sent to the variable current generator 33 through the associated dedicated connection.

In fact, the threshold of comparator 51 is exceeded only by very short time intervals (pulse signal VI), at the upward fronts of the optical pulses 5, and the output signal VD of the low-pass filter 53 is held below the fixed comparison value VX defined by the voltage generator 57, so keeping diode 59 in a non-conducting state. The voltage generator 57 is suitably dimensioned and the exceeding of the comparison value VX indicates the presence of a signal, arriving from the amplifier 15, with definitely higher duty-cycle than that of the sequence of optical pulses 5.

In practice, in the arrangement shown in FIG. 5 the discriminating circuits 50 do not intervene and the so far provided description corresponds to the known prior art mentioned with reference to FIG. 2. The temporary reduction in sensitivity controlled by the detection circuits 40 prevents the generation of spurious pulses caused by possible distortions of the received signal 5 but, as already mentioned, does not provide adequate protection against sufficiently strong noises arriving, for example, from fluorescent lamps.

Figure 6:
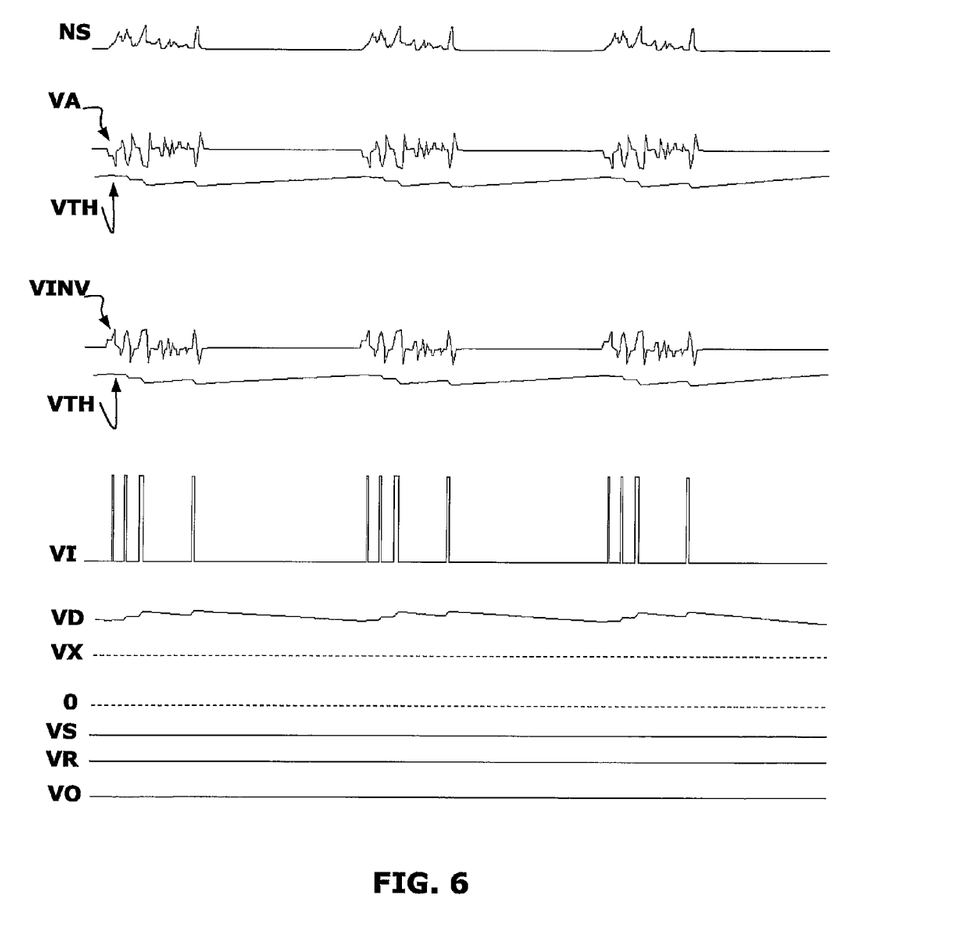

In FIG. 6 the first line represents a noise signal NS emitted, for example, by a fluorescent lamp and received by the photodiode 13.

The presence of the noise signal NS is detected in the discriminating circuits 50 where the output signal VI output of the additional comparator 51 appears qualitatively different with respect to the arrangement of FIG. 5. In practice there is revealed the presence of a signal with sufficiently high duty-cycle that enables the low-pass filter 53 to generate a slowly variable (owing to the characteristics of the filter 53) signal VD that exceeds the fixed comparison value VX defined by the voltage generator 57. The output of the additional differential amplifier 55 causes the diode 59 to conduct and determines an increase in the current I1 supplied by the variable current generator 33 with a consequent decrease (an increase in absolute value) of the basis value VTH0 of the threshold VTH. In practice, the threshold VTH takes slowly variable values, that follow the trend of the output signal VD of the low-pass filter 53, that, in terms of absolute value, are greater than the peak value of the noise signal NS. More specifically, the diode 59 closes a further feedback loop that, if the loop gain is sufficiently high, causes VTH to be more negative so that the fraction of its absolute value, defined by the ratio of the values of the resistances R1 and R2 of the resistors 35 and 36 and sent to the non-inverting input of the comparator 51, approaches the peak value of VA. In consequence, the absolute value of VTH0 exceeds the peak value of VA: if R1=R2, it approaches the double of the peak value of VA.

As a consequence of the rise of the basis value VTH0 of the threshold VTH, the comparators 23 and 24 do not generate any pulse (lines VS and VR), and there is no signal (VO) at the output of the flip-flop consisting of the "NAND" gates 26 and 27. Thus the receiver is properly unaffected by the noise NS. Under these conditions the signal VA provided by the amplifier 15 does not reach (and therefore neither does it exceed) the value VTH0 of the threshold VTH and thus the diode 47 does not conduct, and the detecting circuits 40 do not cause any variations in the threshold VTH.

Figure 7:
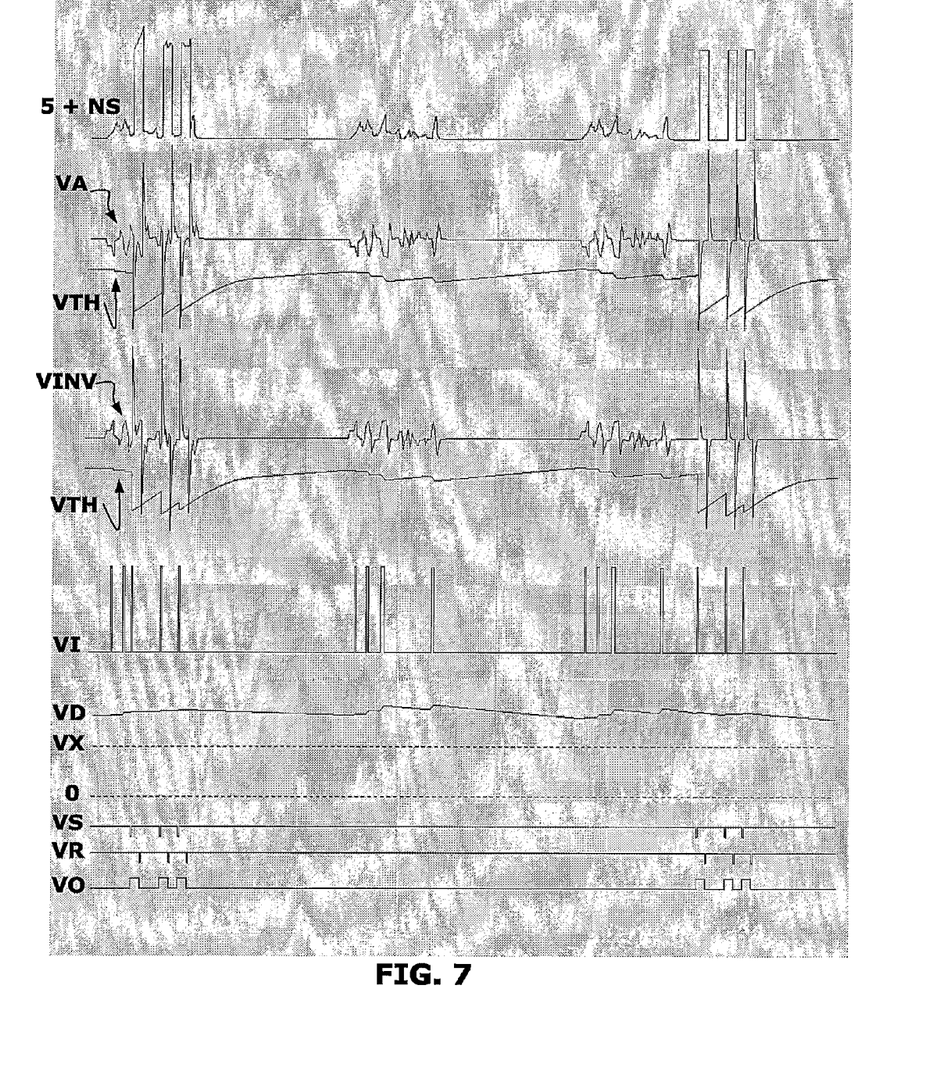

The graphs of FIG. 7 show the arrangement according to which the photodiode 13 receives a signal 5+NS, i.e. a noise NS superimposed on a useful signal 5. The first line in FIG. 7 indicates the signal 5+NS.

In this case, both the detecting circuits 40 and the discriminating circuits 50 dynamically vary the threshold VTH that undergoes, owing to the effect of the formers (40), quick increments at the upward fronts of the received signal 5, and owing to the latters (50) returns to values—proportional to the fixed current I0 and variable current I1—that exceed in terms of absolute value the peak value of the noise NS, but, thanks to the relatively high time constant of filter the 53, can be exceeded by the amplitude of the short optical pulses 5 arriving from the transmitter 4, obviously under the hypothesis that the latters are received with intensity that is sufficiently greater than that of the noise NS. In the event that, at the pulses of the useful signal 5, the signal VA surpasse by little, in terms of absolute value, the threshold VTH, the detection circuits 40 would not intervene. Thus even when there are noises NS, the proper reconstruction of the sequence of pulses VO as described with reference to FIG. 5 is enabled whereas, thanks to the discriminating circuits 50, the sensitivity of the receiver 7 is suitably and dynamically diminished to obtain immunity to the noise signals NS. In FIG. 7 it is possible to easily distinguish the two different decay time constants of the threshold VTH: the shorter time constant is due to the detecting circuits 40, while the longer one is due to the discriminating circuits 50.

In practice, the parameters of the discriminating circuits 50 are chosen so that when just the useful signal 5, that has a very short duty-cycle (approximately one per thousand), as previously described, is received, the voltage VD output from filter 53 does not reach the fixed reference value VX. In this way the sensitivity of the receiver 7 is not diminished at all. On the contrary, if just noise (NS) is received, the threshold VTH is suitably shifted and in this way, by diminishing the sensitivity of the receiver 7, it is possible to prevent the sending of noises to the interface device 9. If, in the second case, a useful signal 5 with sufficient amplitude overlaps the noise NS, the former is properly reconstructed (VO) and noiseless transmitted to the interface device 9.

In fact, it is true that the addition of the useful signal 5 initially increases the number of pulses of the sequence VI at the output of the additional comparator 51, and consequently tends to increase VD and thus further decrease (increase, in terms of absolute value) VTH. Nevertheless, just a very small decrease of VTH is sufficient for strongly reducing the contribution of the noise NS to the generation of pulses VI by the additional comparator 51 and prevent a further diminution in sensitivity. Therefore, in this case too, the useful signal 5 practically has no effect on the basis value VTH0 of the threshold VTH as defined by the currents I0 and I1 and the varying of the basis value VTH0 of the threshold VTH in practice only depends on the received noise NS and is of greater amplitude with respect to the peak value of the noise NS.

According to a practical embodiment of the receiver unit 7, shown in simplified form in FIG. 4, a transistor NPN configured as common emitter amplifier with a resistance in series with the emitter can accomplish in a per se known way the functions of the additional differential amplifier 55, of the voltage generator 57, of the diode 59 and of the variable current generator 33. In this practical embodiment, the fixed comparison value VX is thus approximately 0.65 V and the value of the current entering the collector is approximated by the ratio between the basis potential diminished by 0.65 V and the resistance of emitter.

According to a possible alternative to the herein so far described embodiment of the receiver unit 7, the output of the discriminating circuits 50 is not connected to the generating circuits 30 for varying the threshold VTH, but to the amplifier 15 for suitably controlling its gain. In FIGS. 3 and 4 a broken line 60 indicates the functional connection to the amplifier 15 of the discriminating circuits 50, more specifically of the diode 59. This alternative embodiment enables to obtain a reduction in sensitivity of the receiver 7 when there are noise signals NS in an entirely equivalent manner as that described with reference to FIGS. 6 and 7.

In practice, depending on the output of the discriminating circuits 50, the difference in amplitude between the signal VA provided by the amplifier 15 and the threshold voltage VTH is in any case dynamically varied. In the embodiment described above with reference to the figures, it is the threshold VTH that is varied, more specifically increased (in terms of absolute value) for diminishing the sensitivity. In the alternative embodiment, schematically shown by line 60, the sensitivity of the receiver 7 is diminished by symmetrically attenuating the amplitude of the input amplified signal. From the circuitral point of view, the amplitude of the signal VA can be controlled in a known way, for example, by means of a field effect transistor, whose channel resistance is varied by the gate voltage, or by a structure with bipolar transistors, whose transconductance is varied by the control signal arriving from the discriminating circuits 50.

Figure 8:
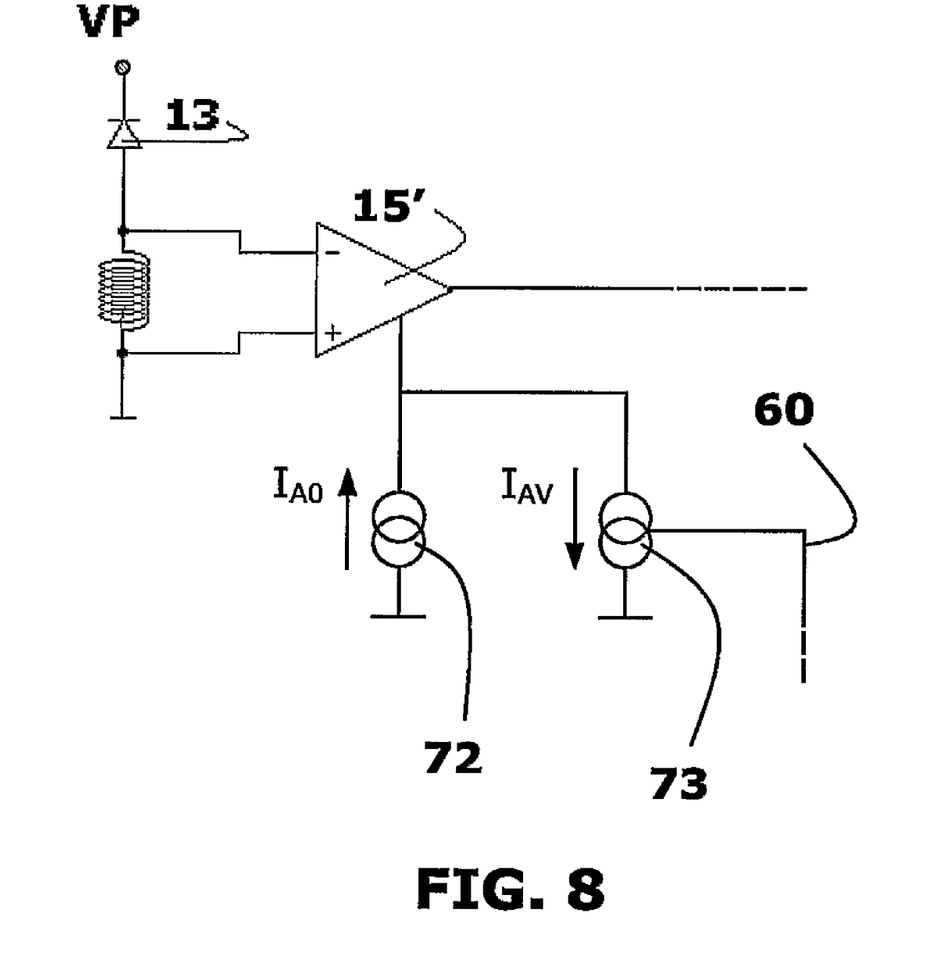
FIG. 8 is a diagram showing some functional blocks of a receiver unit according to an embodiment alternative to the one of FIG. 4.

Some functional blocks of a possible alternative configuration of the receiver unit of FIG. 4 are shown in FIG. 8, and include a transconductance amplifier 15' (being a particular embodiment of the amplifier 15), a further fixed current generator 72 and a further variable current generator 73. The amplifier 15' has a transconductance gm (i.e. a ratio of output current variation to the input voltage variation) that is controlled by currents $I_{40}$ (fixed) and $I_{AV}$ (variable) provided by the generators 72 and 73. The currents $I_{40}$ defines the maximum gain of the amplifier 15'. The variable current generator 73 is coupled to the output of the diode 59 through coupling 60, in order to control the variable current $I_{AV}$.

FIG. 8 shows just a possible embodiment of an amplifier whose gain can be controlled on the basis of a variable entity, other known solutions being possible.

Other possible circuital and/or functional arrangements, that enable to dynamically vary the difference between the signals VA and VTH based on the attributes of the received signal detected by the discriminating circuits 50, fall within the scope of the present invention.

Thus, the receiver unit 7 of a system according to the present invention enables to check in an automatic way the sensitivity of the receiver 7 by verifying attributes of the received signal, the consequent identification of noise signals (NS) and the variation of the threshold or, in general, of the difference between the input signal (VA) and the threshold (VTH), in a way that the latter is sufficiently above the peak value of the component of the signal VA due to the noises NS. In this way the system is immune to noises caused by unexpected and unwanted signals (in the described arrangement, optical signals) in the workshop environment, while continuing to guarantee the proper reception of the useful signals (5) even in the case of a quick drop of intensity of the latters, caused, for example, by the probe 1 and the associated transmitter 4 rapidly displacing away from the receiver 7.

Obviously it is necessary that when there are noises, the useful signal (5) be received with adequately greater intensity than that of the noises (NS), as typically required for the correct operation of telecommunication systems.

Hence, in a system and a method according to the present invention it is possible to automatically adapt the sensitivity of the receiver 7 to the specific noise situation (more specifically, optical noises) in the surrounding environment, and thus exploit in an optimum way the signal-noise ratio.

Systems and methods according to the invention can differ in terms of implementation with respect to what has been herein illustrated and so far described.

In the automatic checking circuits of the receiver unit 7 it is possible to leave out, or disable, for example, the detecting circuits 40 that have the function, as noted above, of rapidly and temporarily varying the amplitude difference between the input signal VA and the threshold voltage VTH for providing immunity to the receiver 7 not against external noises, but against unwanted pulses generated by the arrival of the actual useful signal 5, particularly if the latter has great intensity.

It is also possible to leave out the derivation made by the inductor 14 and, in consequence, give up the already previously mentioned benefits it provides. In this case the aspect of the signal VA will be the more alike the received optical pulses 5 and thus it can be reconstructed by simply comparing it with the threshold VTH by means of a single comparator, therefore sparing the other comparator, the inverter 21 and the flip-flop 26, 27.

According to another possible embodiment of the receiver unit 7, the presence of the amplifier 15 is not foreseen. For example, when the photodiode 13, acting as a current generator, is "loaded" with a suitably high impedance 14 in the frequency band of the useful signals, the input signal VA, supplied by the photodiode 13, has sufficiently high amplitude and does not need further amplification.

Obviously, even if in the arrangement of FIG. 4 the threshold VTH has negative value (as the pulses of the signals VA and VINV are negative, owing to the particular interconnections of the various components and circuits, corresponding, respectively, to the upward and downward fronts of the received optical pulses 5), it is possible to invert the polarities of the signals VA and VINV in output from the amplifier 15 and from the inverter 21 (in this specific case is the same as exchanging them) and the sign of the threshold VTH without affecting in any way the essence of the invention.

Furthermore it is possible to implement the invention by utilizing systems in which the transmitted signal 5 is of a different type, for example a radio-frequency pulse signal instead of an optical signal.

A system according to the present invention can obviously include a plurality of probes (1) with associated transmitters (4) that transmit signals to one (or more) receiver units (7) that can, in turn, include a plurality of photodiodes or other receiver devices (13).

In a system as the herein described one, there can be foreseen the possibility of enabling or not the automatic sensitivity check of the receiver 7 implemented by means of the discriminating circuits 50, in order to carry out verifications and tests in the event anomalous behaviour occur (for example, in the event it is desired to verify the actual presence of noise signals NS in the environment).

This can be performed in a manual way, by means of the manually-operated programming devices 18, or by means of an additional conductor in the interface connection cable (not shown in the figures), dedicated in a known way to the managing of the options about the sensitivity of the receiver 7. Therefore, there are many ways for implementing and controlling the sensitivity check, by means of different types of connection of the additional conductor.

Just as an example, if the conductor is disconnected, it can correspond to a condition according to which the automatic sensitivity check is disabled and the sensitivity of the receiver 7 is the nominal one (current generator 33 off), if the conductor is connected to ground, the optical sensitivity is reduced, for example, in a permanent way with no automatic variations, whereas if the conductor is connected to a positive power supply voltage, it is possible to enable the automatic sensitivity check.

The invention claimed is:

1. A system for detecting position or dimensions of an object comprising:
   at least one checking probe with detection devices,
   a remote transmission unit, electrically connected to the detection devices of said at least one probe, and adapted for wirelessly transmitting pulse signals indicative of a state of said at least one probe, and
   a receiver unit, adapted for wirelessly receiving signals, the receiver unit comprising:
      an input section, with at least one receiver device, adapted for providing input signals,
      a generation and control section adapted for generating and for defining reference signals, and
      a comparison section, electrically connected to the input section and the generation and control section, adapted for providing output signals responsive to results of comparison between the input signals and the reference signals,
      the generation and control section comprising threshold generation circuits and automatic checking circuits for checking difference in amplitude between the input signals and the reference signals, wherein said automatic checking circuits comprise discriminating circuits adapted for detecting at least one attribute of the input signals and for varying said difference in amplitude if said at least one detected attribute corresponds to the wirelessly received signals that differ from said pulse signals transmitted by the remote transmission unit.

2. The system according to claim 1, wherein said input section includes amplification circuits for the received signals, said input signals being amplified signals.

3. The system according to claim 2, wherein said discriminating circuits are electrically connected to the amplification circuits for varying in amplitude said amplified signals.

4. The system according to claim 1, wherein said at least one attribute is a distribution in amplitude of the input signals.

5. The system according to claim 4, wherein the discriminating circuits include components adapted for evaluating duty-cycle of the input signals.

6. The system according to claim 5, wherein the discriminating circuits include components adapted for detecting the input signals with the duty-cycle exceeding a predetermined value, and for consequently varying said difference in amplitude.

7. The system according to claim 1, wherein the automatic checking circuits also include detecting circuits adapted for detecting peak values of the amplitude of the input signals, the detecting circuits being electrically connected to the threshold generator circuits for dynamically and temporarily varying said reference signals.

8. The system according to claim 1, wherein said discriminating circuits are electrically connected to the threshold generating circuits for varying in amplitude said reference signals.

9. A method for checking the dimensions or the position of an object, by means of at least one checking probe including detection devices, at least one remote transmission unit electrically connected to said at least one checking probe and adapted for wirelessly transmitting signals in the form of pulses, and a receiver unit, adapted for receiving said signals in the form of pulses, the method comprising:
   comparing amplitude of input signals in the receiver unit with reference signals for providing output signals,
   identifying noise signals on the basis of attributes differing from those of the signals transmitted by the remote transmission unit, and
   varying in a dynamic way difference in amplitude between the reference signals and the input signals.

10. The method according to claim 9, wherein said step of identifying the noise signals is carried out based on a distribution in amplitude of the input signals that differs from that of the signals transmitted by the remote transmission unit.

11. The method according to claim 10, wherein said step of identifying the noise signals is carried out based on a verification of a duty-cycle value of the input signals.

12. The method according to claim 11, wherein said step of identifying the noise signals is carried out by a comparison of the duty-cycle of the input signals with a predetermined minimum value.

13. The method according to claim 9, wherein said step of varying the difference in amplitude comprises making the reference signals greater than, in terms of absolute value, a peak amplitude of a component of the input signals corresponding to the noise signals.

14. The method according to claim 9, wherein in the receiver unit, said signals in the form of pulses are received and amplified in order to obtain said input signals.

15. The method according to claim 14, wherein said step of varying the difference in amplitude includes an automatic control of the amplitude of the input signal.

16. The method according to claim 9, wherein said step of varying the difference in amplitude includes an automatic check of the amplitude of the reference signals.

* * * * *